US012404056B2

(12) United States Patent
Cirette et al.

(10) Patent No.: US 12,404,056 B2
(45) Date of Patent: Sep. 2, 2025

(54) DEVICE AND METHOD FOR FORMING A CONTAINER BY FOLDING

(71) Applicant: SIDEL PARTICIPATIONS, Octeville-sur-Mer (FR)

(72) Inventors: Damien Cirette, Corcelles-les-Citeaux (FR); Arnaud Prieur, Corcelles-les-Citeaux (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 226 days.

(21) Appl. No.: 17/760,750

(22) PCT Filed: Sep. 15, 2020

(86) PCT No.: PCT/EP2020/075768

§ 371 (c)(1),
(2) Date: Mar. 15, 2022

(87) PCT Pub. No.: WO2021/052961

PCT Pub. Date: Mar. 25, 2021

(65) Prior Publication Data

US 2022/0332447 A1 Oct. 20, 2022

(30) Foreign Application Priority Data

Sep. 16, 2019 (FR) ...................................... 1910202

(51) Int. Cl.
*B65B 7/20* (2006.01)
*B31B 50/00* (2017.01)
(Continued)

(52) U.S. Cl.
CPC ............ *B65B 7/20* (2013.01); *B31B 50/0042* (2017.08); *B65B 11/004* (2013.01);
(Continued)

(58) Field of Classification Search
CPC ....... B65B 7/20; B65B 11/004; B65B 11/105; B65B 11/12; B65B 43/126; B65B 49/08; B65B 49/14; B31B 50/0042
See application file for complete search history.

(56) References Cited

U.S. PATENT DOCUMENTS 2,082,408 A * 6/1937 Lyon ........................ B65B 11/10
53/73
2,358,292 A * 9/1944 Malhiot ................. B65G 17/26
198/803.11

(Continued)

FOREIGN PATENT DOCUMENTS

CN 105947261 A 9/2016
EP 1231147 A1 8/2002
EP 2236425 A1 10/2010

OTHER PUBLICATIONS

International Search Report dated Nov. 17, 2020 for PCT/EP2020/075768.

*Primary Examiner* — Anna K Kinsaul
*Assistant Examiner* — David G Shutty
(74) *Attorney, Agent, or Firm* — Stephanie L. Davy-Jow; Blake T. Hudson

(57) ABSTRACT

The present invention relates to the forming of a container by folding a cardboard sheet with at least vertical flaps, using a forming device and a forming method. Such a device comprises an upstream conveyor driving said cardboard sheet in a direction of travel, a downstream conveyor, means for folding the vertical flaps, said folding means being situated symmetrically about said upstream conveyor, and is characterized in that, on each side, said folding means comprise a pair of downstream and upstream pushers forming a gripper, said pushers being actuated jointly from an open position toward a closed position of folding said corresponding vertical flaps, a support for each gripper, said support being mobile in said direction of travel.

19 Claims, 6 Drawing Sheets

(51) Int. Cl.

| | |
|---|---|
| ***B65B 11/00*** | (2006.01) |
| ***B65B 11/10*** | (2006.01) |
| ***B65B 11/12*** | (2006.01) |
| ***B65B 43/12*** | (2006.01) |
| ***B65B 49/08*** | (2006.01) |
| ***B65B 49/14*** | (2006.01) |

(52) U.S. Cl.
CPC ............ *B65B 11/105* (2013.01); *B65B 11/12* (2013.01); *B65B 43/126* (2013.01); *B65B 49/08* (2013.01); *B65B 49/14* (2013.01)

(56) References Cited

U.S. PATENT DOCUMENTS 3,325,977 A * 6/1967 Rolf ........................ B65B 43/54 198/803.11
4,215,525 A * 8/1980 Nigrelli ................... B65B 5/068 53/209
4,641,742 A * 2/1987 Igarashi ............... B65G 17/323 198/626.5
4,893,707 A * 1/1990 Langen .................. B65G 17/26 198/803.11
5,775,064 A * 7/1998 Iwata ...................... B65B 49/14 53/466
6,260,690 B1 * 7/2001 Batzer .................... B65H 39/04 198/732
6,622,461 B2 * 9/2003 Gambetti .............. B65B 51/023 493/131
6,811,024 B2 * 11/2004 Wieduwilt ............ B65B 59/005 198/803.13
7,311,193 B2 * 12/2007 Fochler .................. B65G 17/46 198/803.14
7,752,828 B2 * 7/2010 Gudim .................. B65B 59/001 198/803.11
9,713,911 B2 * 7/2017 Cavazza ............... B65B 43/265

* cited by examiner

DEVICE AND METHOD FOR FORMING A CONTAINER BY FOLDING

CROSS-REFERENCE TO RELATED APPLICATION

This application is a national stage patent application of PCT Patent Application No. PCT/EP2020/075768 filed Sep. 15, 2020, which claims Priority to French Patent Application No. 1910202 filed Sep. 14, 2019, both of which are incorporated by reference herein in their entirety.

The present invention falls within the field of the shaping of cardboard sheets using folding in order to form containers in which to package at least one product but preferably a plurality of products.

For the purposes of the present invention, the term "product" covers a single object. Such a product is a vessel, such as a bottle or a vial, or else a can or even a cardboard carton. Such products may also be grouped together, positioned in a sleeve pack or "cluster" and/or wrapped in a film. A product may be made of any material, notably of plastic, of metal or even of glass. A product may be rigid or semirigid. Such a vessel is intended to contain, and this list is not exhaustive, a fluid, liquid, powders or granules, notably of the agri-foodstuff or cosmetic type. A product may exhibit any type of shape, symmetrical or otherwise, regular or irregular.

TECHNICAL FIELD

The present invention falls within the field of the shaping of cardboard sheets using folding in order to form containers in which to package at least one product but preferably a plurality of products.

For the purposes of the present invention, the term "product" covers a single object. Such a product is a vessel, such as a bottle or a vial, or else a can or even a cardboard carton. Such products may also be grouped together, positioned in a sleeve pack or "cluster" and/or wrapped in a film. A product may be made of any material, notably of plastic, of metal or even of glass. A product may be rigid or semirigid. Such a vessel is intended to contain, and this list is not exhaustive, a fluid, liquid, powders or granules, notably of the agri-foodstuff or cosmetic type. A product may exhibit any type of shape, symmetrical or otherwise, regular or irregular.

Such products are obtained on an industrial production line, undergoing a plurality of successive processing operations as they pass through dedicated workstations, such as, for example, the blow-molding of plastic bottles or vials, filling and capping, labeling, or even sterilization or pasteurization. Once processed, the finished products are packaged in groups into batches, the products being held together by a plastic film, notably shrink-wrapped through a film-wrapping operation, or else inside containers.

Such containers may take the form of cardboard cases or "cardboard boxes" for the packaging of products. Such cardboard boxes have a rectangular parallelepipedal shape, with an interior volume capable of accepting a group of products, in a staggered configuration but preferably arranged in a matrix of rows and columns, or even several groups of products superposed.

In a known way, the automated making-up of cardboard cases is performed by folding precut and preformed cardboard sheets also known as "box blanks".

With reference to FIG. 1 which depicts a view in elevation of one example of a cardboard sheet 100, laid out flat, it comprises a bottom 101, intended to accept the products on its upper face, which will be positioned on the inside once the container has been formed. On either side of said bottom 101, along the longitudinal edges thereof, the cardboard sheet 100 comprises two lateral walls, namely a left lateral wall 102 and a right lateral wall 103.

The cardboard sheet 100 also comprises a lid 104, along one longitudinal edge of one of the lateral walls, such as the right lateral wall 103 for example. Along an opposing longitudinal edge of the other lateral wall, respectively the left lateral wall 102, the cardboard sheet 100 comprises a tab 105. Alternatively, the tab 105 may be fixed to the lid 104, on the opposite side to the longitudinal edge connecting with said one of the lateral walls; said tab 105 is then commonly referred to as an "external sealing flap".

At each end, the cardboard sheet 100 comprises flaps, at least four of these, on the one hand, vertical flaps 106 connected to the lateral walls along their transverse edges and, on the other hand, horizontal flaps 107 connected to the bottom 100 and to the lid 104 along their transverse edges.

With reference to FIG. 2 which depicts a perspective view of the sheet of FIG. 1 during the process of being folded into shape, after a prior step of folding the left 102 and right 103 lateral walls orthogonally with respect to the bottom 101, the tab 105 is folded orthogonally, with an application of glue made on its exterior face, whereas the lid is folded over until it comes into contact with said exterior face of the tab 105, and with the applied glue, as visible in FIG. 3, thus delimiting the interior volume of the container in the form of a cardboard case 1.

Alternatively, in the event of a cardboard case provided with an external sealing flap, the lid 104 is folded first of all, then the external sealing flap is folded down on top of the previously glued adjacent lateral wall.

Next, during other successive steps, for each end, the vertical flaps 106 are folded orthogonally, with an application of glue to the exterior face, then the horizontal flaps 107 are folded over until they come into contact with the corresponding vertical flaps 106 and with the applied glue. The cardboard case 1 is thus formed and completely sealed, as visible in FIG. 5.

Such a method may be applied to the forming of a tray, which has only a bottom 101, lateral walls 102, 103 and vertical flaps 106, as well as only horizontal lower flaps 107. Such a tray therefore has no lid and tab. This tray generally has a height less than that of the products. A formed tray such as this is visible in FIG. 6.

It will be noted that the forming achieved by folding the cardboard sheet 100 is generally performed with the products already grouped together and positioned on the upper face of the bottom 101. The folding is therefore done around the products that will be enclosed in the container 1 thus obtained by the folding of the cardboard sheet 100. This boxing operation is commonly known as "wrapping" (using a wrap-around blank).

More specifically, the forming of such a container 1 from a sheet 100 can be performed sequentially, step-by-step, with the sheet 100 halted at each step. In the type of machine to which the invention relates, the forming is preferably performed continuously, with the sheet 100 traveling on conveyors passing through various workstations dedicated to the successive steps of folding of the various parts of said sheet 100, namely first of all the simultaneous folding of the left 102 and right 103 lateral walls, then the folding of the tab 105 which occurs at the same time as the lid 104 is folded over to form the volume of the future container 1, then the folding of the vertical flaps 106, followed by the folding of the horizontal flaps 107.

The invention is more especially aimed at a continuous forming by folding of a cardboard sheet with a view to forming a container, specifically the folding of the vertical flaps of such a cardboard sheet.

Such a folding operation is performed by a forming device comprising several successive workstations dedicated to each of the aforementioned folding steps. At least one conveyor, on its upper face, transports each cardboard sheet in a direction of travel from upstream to downstream through the various modules as far as at least an output conveyor. In particular, the forming device comprises means for folding the vertical flaps, which are situated symmetrically on either side of said conveyor and act in a synchronized fashion in order to fold, jointly, the vertical flaps situated to the right and to the left with respect to said direction of travel.

To do this, document EP 0 849 176 describes a forming device comprising means for folding the vertical flaps which are provided with rotary pushers positioned fixedly on either side, namely to the right and to the left, of the conveyor transporting the cardboard sheet. Such pushers can be likened to motorized star-wheels rotating in the same direction as the flow, according to a specific law of motion dictated by the speed of travel of said conveyor. In addition, each star-wheel is dimensioned with branches that are spaced according to the length of the case that is to be formed, so that as the partially folded case moves along, firstly, a first branch of each star-wheel comes to press against each of the vertical flaps situated downstream and folds it at a right angle, and secondly, another branch of each star-wheel folds the vertical flaps situated upstream. In short, the vertical flaps at the front are closed together first of all, followed by those at the rear.

A similar solution equipped with rotary pushers is described in document DE 10 2011 016 857.

Another known solution comprises pushers mounted on belts or chains extending along each side of the conveyor transporting the cases that are in the process of being formed. The driving of the belts is synchronized with the speed of said conveyor. In addition, the pushers are positioned at intervals dependent on the length of said case, so that as it moves along, a first downstream pusher of each belt first of all folds the downstream vertical flaps, and then a subsequent upstream pusher folds the upstream vertical flaps.

Such systems cause problems as a result of the successive interventions of folding the vertical flaps downstream and then upstream with respect to the direction of travel of the case that is to be formed. Specifically, the pressure applied first of all at the front, combined with the speed of travel, is liable to cause the partially formed case to move and shift it out of position on account of the fact that the case is resting on the upstream conveyor and moved along only by the grip provided by its bottom resting on the upper face of said conveyor.

Furthermore, this successive folding may push the products in the upstream direction, particularly in the case of products that are lightweight and slippery, such as metal cans, especially the products situated at the center. As a result, the folding of the rear vertical tabs is performed against products that are partially out of the case, which may be pushed back in, but if they are not, may prevent the folding, particularly the subsequent folding of the horizontal flaps, that occurs immediately after.

In this respect, the folding of the horizontal flaps may be performed by lower and upper conveyors, equipped with spaced-apart end stops, which also push on the horizontal flaps successively, downstream then upstream. Furthermore, at the moment of this folding, the case is completely trapped between the end stops of the lower and upper conveyors. As a result, if the vertical flaps have been incorrectly folded, or else if a product is not fully contained inside the case, the cardboard material finds itself stressed, deformed or even torn, something which is likewise liable to interfere with the operation of the forming device, requiring a stoppage that is detrimental to production in order to remove the defective case and make adjustments. Furthermore, the products contained in a defective case are taken out of the production cycle and lost.

Furthermore, the folding of the vertical flaps successively, downstream first and then upstream, is therefore liable to deform the case. Specifically, an optimal rectangular parallelepipedal shape with the walls properly orthogonal is important and needs to be optimal—firstly, for the sake of the aesthetic appearance and correct packaging of the products, but also and especially, when several cases are to be stacked, notably on pallets. The deformation of one single case is liable to unbalance a stack of cases, making them precarious and dangerous for operators to handle.

More specifically, another disadvantage arises out of the folding of the vertical flaps using said folding means, which then has to be followed by the folding of the horizontal flaps with an overlap. Specifically, it is then necessary to transfer the partially formed case, containing products, from the input conveyor to the output conveyor, particularly to the lower and upper conveyors. During the course of this transfer, the case is therefore not supported, passing through a dead zone or even empty space for the passing of the end stops of the lower conveyor. During this passage, the case therefore overhangs off the end of the downstream conveyor, unsupported and resting only via grip on said conveyor, before its part situated upstream reaches the output conveyor, and in particular comes between the lower and upper conveyors. This passage is liable to unbalance or unsynchronize the partially formed case, and/or to cause the products that it contains to shift, making it an even more complex matter to perform the folding of the vertical flaps, and also the subsequent folding of the horizontal flaps, impairing the forming which is intended to be optimal.

It is an object of the invention to alleviate the disadvantages of the prior art by proposing a shaping of cardboard sheets using folding in order to form containers, which aims to fold the vertical flaps, downstream and upstream, simultaneously. Such simultaneous folding is obtained by pairs of pushers forming grippers on each side, said grippers being actuated jointly.

Furthermore, in combination, the invention provides for the case to be accompanied as it moves along, especially as it passes from the upstream conveyor to the output conveyor situated downstream, particularly in the case of two, one upper and one lower, conveyors. Such accompaniment is obtained by gripping performed by the grippers.

In short, the invention plans for the case and the products it contains to be taken hold of at the moment of the folding of the vertical flaps, so that a positive transfer can be made. Furthermore, this transfer ensures precise and known referencing of the container thus formed during the course of this transfer.

SUMMARY

In order to do this, the invention relates to a device for forming a container by folding a cardboard sheet, said sheet being provided with at least vertical flaps, comprising at least:

- an upstream conveyor driving said cardboard sheet in a direction of travel;
- a downstream conveyor;
- means for folding the vertical flaps of said cardboard sheet, said folding means being situated symmetrically on either side of at least said upstream conveyor.

Such a forming device is characterized in that, on each side, said folding means comprise:

- a pair of downstream and upstream pushers forming a gripper, said pushers being actuated jointly from an open position toward a closed position of folding said corresponding vertical flaps, and vice versa;
- a support for each gripper, said support being mobile in said direction of travel.

Thus, the synchronized mobility of the folding means in the form of grippers ensures that the case is gripped during and after the folding of the vertical flaps, the gripping accompanying the movement of the case.

According to nonlimiting additional features, such a forming device may comprise at least one controller controlling, in synchronized manner, the joint actuation of the pushers of each gripper on each side with the movement of said support, with respect to the driving of said upstream conveyor.

When the pushers are in the closed position, said folding means can form a means for transferring said sheet from said upstream conveyor toward said downstream conveyor by gripping said sheet.

Each pusher may be mounted with the ability to rotate with respect to said support.

The pushers may be situated facing each other are offset vertically.

The pushers of each gripper may have adjustable separation.

Each of said pushers may comprise a removable gripping head.

Said head may comprise at least a plate provided with an orthogonal concave contact surface.

Each support may be motorized for translational movement along at least a guide from an upstream position to a downstream position, and vice versa.

The invention also relates to a method for forming a container by folding a cardboard sheet, said sheet being provided with at least vertical flaps, in which method at least:

- a cardboard sheet is driven in a direction of travel on the upper surface of an upstream conveyor toward at least a downstream conveyor;
- said vertical flaps on each side of said cardboard sheet are folded;
- characterized in that:
- the vertical flaps situated downstream and upstream in relation to said direction of travel are folded simultaneously by gripping each side simultaneously by closing a gripper.

According to nonlimiting additional features, in such a forming method, each gripper may be moved jointly in said direction of travel in a manner synchronized with the driving of said cardboard sheet by said upstream conveyor.

In the closed position, said cardboard sheet may be transferred from said upstream conveyor toward said at least one downstream conveyor.

BRIEF DESCRIPTION OF THE DRAWINGS

Other features and advantages of the invention will emerge from the following detailed description of nonlimiting embodiments of the invention, with reference to the appended figures, in which.

It will be noted that, for better legibility, FIGS. 9 to 14 do not depict the horizontal flaps of the sheet.

DETAILED DESCRIPTION OF THE INVENTION

In the context of the present invention, unless explained otherwise, it will be noted that the term "sheet" encompasses the cardboard sheet in the form of a flat box blank and also throughout all of the folding steps when the case or the tray is partially formed, up to the point at which a fully formed container 1 is obtained. Likewise, unless stipulated otherwise, the term "container" corresponds to a case or a tray that has been fully formed, namely after its horizontal flaps have been folded.

The present invention relates to the forming of a container 1 by folding of a cardboard sheet 100.

Figure 1:
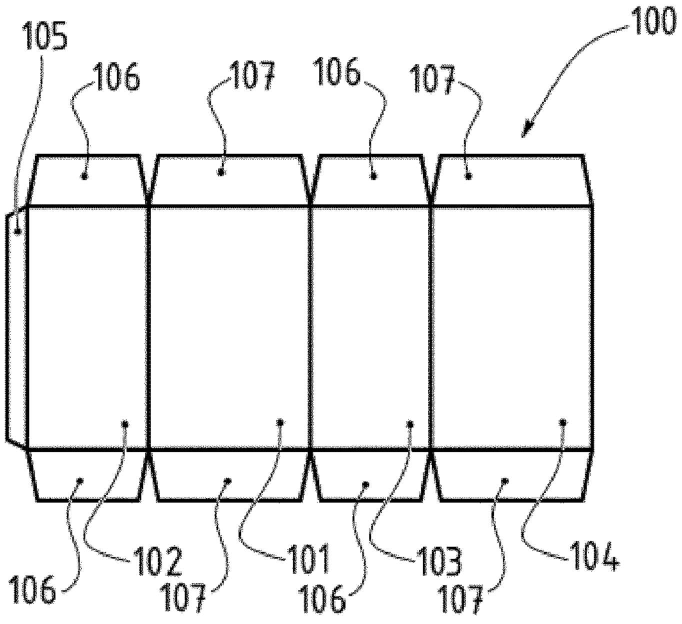
FIG. 1 schematically depicts a view in elevation of one example of a cardboard sheet.
Figure 2:
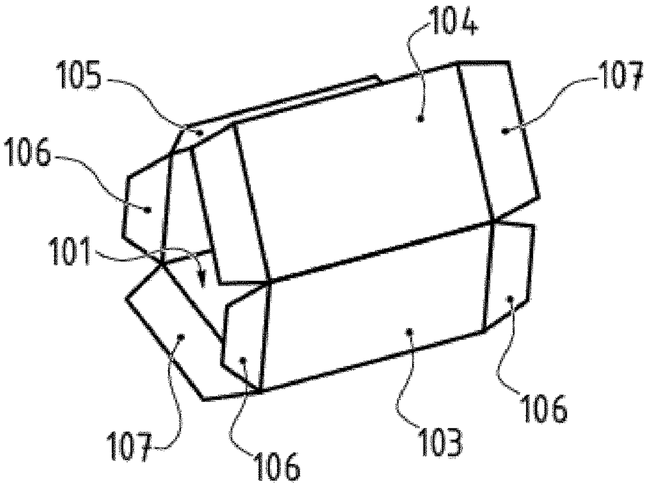
FIG. 2 schematically depicts a perspective view of said cardboard sheet of FIG. 1 after a first step of folding the lateral walls.
Figure 3:
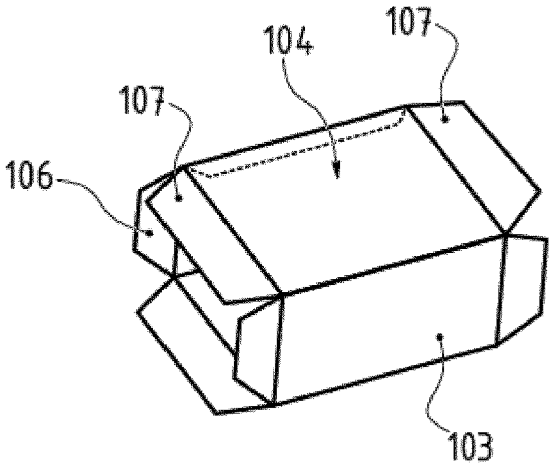
FIG. 3 schematically depicts a perspective view of said cardboard sheet of FIG. 1 after a second step of folding the lid over onto the tab.
Figure 4:
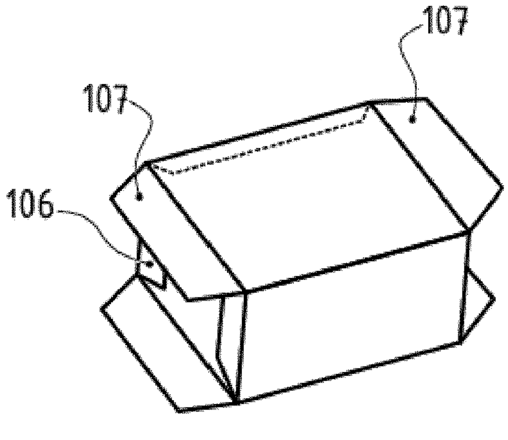
FIG. 4 schematically depicts a perspective view of said cardboard sheet of FIG. 1 after the folding of the vertical flaps.
Figure 5:
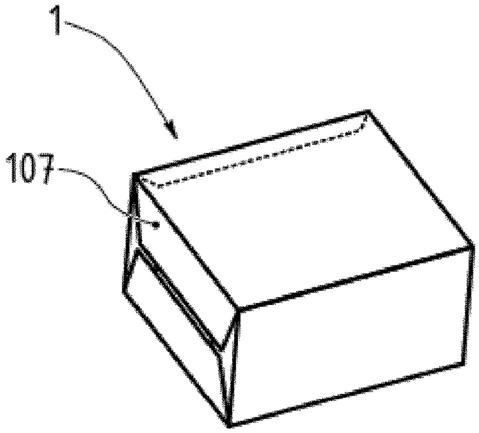
FIG. 5 schematically depicts a perspective view of said cardboard sheet of FIG. 1 after the folding of the horizontal flaps, said case thus being formed.
Figure 6:
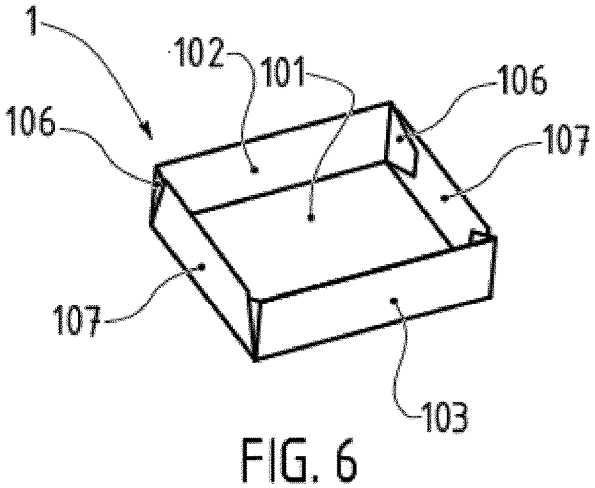
FIG. 6 schematically depicts a perspective view of another cardboard sheet after it has been formed into a tray.

A container 1 may take the form of a case, as visible in FIG. 5, or of a cardboard tray, as visible in FIG. 6. A container 1 is intended for the packaging of products. In order to do that, a container 1 has a rectangular parallelepipedal shape, with an interior volume capable of accepting a group of products, in a staggered configuration but preferably arranged in a matrix of rows and columns, or even several groups of products superposed.

It will be noted that a product is an individual object of vessel type, such as a bottle or a vial, or else a can or even a cardboard carton. A plurality of products may also be grouped together, positioned in a sleeve pack or "cluster" and/or wrapped in a film. A product may be made of any material, notably of plastic, of metal or even of glass. A product may be rigid or semirigid. Such a vessel is intended to contain, and this list is not exhaustive, a fluid, liquid, powders or granules, notably of the agri-foodstuff or cosmetic type. A product may exhibit any type of shape, symmetrical or otherwise, regular or irregular.

To improve legibility of the drawings, the products have not been depicted in the figures.

As mentioned previously, the automated making-up of containers 1 is performed by folding precut and preformed cardboard sheets 100 also known as "box blanks".

The invention is quite especially aimed at the forming of a container 1, notably continuously, by the folding of a cardboard sheet 100. Such continuous forming is achieved by having a cardboard sheet 100 travel through an installation dedicated to the packaging of products.

It will be noted that, within the meaning of the invention, unless stipulated otherwise, travel is in a direction of travel notably visible in FIGS. 9 to 14; this direction of travel extending longitudinally through the installation, notably in a direction from upstream to downstream. The following description of the potential positions is to be understood in relation to this direction of travel, particularly so far as the terms "on either side", "on the right" or "on the left" are concerned.

Such an installation comprises a plurality of successive workstations involved in folding the various parts of each sheet 100, while in a synchronized manner accompanying its movement, until a corresponding container 1 is obtained.

One or more workstations of the installation may be or form part of a device 2 for the forming of a container 1 by the folding of a cardboard sheet 100 according to the invention. As a preference, such a forming device 2 is dedicated to the folding of the vertical flaps 106 of said sheet 100. In short, said sheet 100 comprises at least vertical flaps 106, preferably a pair of vertical flaps situated at each end, front and rear/upstream and downstream, each vertical flap 106 of each pair being situated on each side/on the right and on the left.

Therefore, the forming device 2 or else a workstation situated upstream, performs the folding of other parts of the sheet 100, such as the simultaneous folding of the left 102 and right 103 lateral walls, then the folding of the tab 105 that takes place at the same time as the lid 104 is folded over until the volume of the future container 1 is obtained, or else the folding over of the lid 104 before the external sealing flap is folded against the corresponding left 102 or right 103 lateral wall. What is more, after the folding of the vertical flaps 106, the forming device 2, or else a workstation situated downstream, performs the folding of the horizontal flaps 107.

Moreover, at the entry to the installation, a workstation provides a supply of products, preferably grouped, and laid-flat cardboard sheets 100. Such a supply workstation notably sets the products down on the upper face of the bottom 101 of each sheet 100.

That being the case, according to the invention, the forming device 2 comprises at least one upstream conveyor 3. This conveyor extends substantially horizontally, receiving each sheet 100 on its upper face. It may be of any type, preferably of the endless loop type, as visible in FIGS. 7 to 9. Furthermore, said endless loop may take the form of a moving band conveyor, a moving belt conveyor or a chain conveyor. Said upstream conveyor 3 therefore drives said sheet 100 in said direction of travel, together with the products thus transported on the sheet 100. This upstream conveyor 3 may extend over all or part of the installation, notably from the supply workstation.

The forming device 2 also comprises at least one downstream conveyor 4. As a preference, said device 2 may comprise, toward the bottom, at least a first downstream conveyor 40 and a second downstream conveyor 41. These conveyors extend substantially horizontally, approximately in alignment in the one same plane as the upstream conveyor 3. They may be of any type, preferably of the endless loop type, with a moving band, (a) moving belt(s) or (a) chain(s). Furthermore, the downstream conveyors 40, 41 are notably dedicated to the folding of horizontal flaps 107 and to the supported transportation of the container 1 that has been formed, once said lower horizontal flaps 107 have been folded. To do this, the downstream conveyors 40, 41 comprise cleats 42 spaced at regular intervals and specially configured. As a result, a sheet 100 transferred toward the downstream conveyors 40, 41 is trapped between the respective cleats 42 which, on the one hand, fold the corresponding horizontal flaps 107 and, on the other hand, trap the container 1 thus formed via its front and via its rear in order to hold it in place as it travels in the downstream direction. In particular, a cleat 42 of the first downstream conveyor 40 folds and holds in place the horizontal flap 107 situated at the rear, while a cleat 42 of the second downstream conveyor 41 folds and holds in place the horizontal flap 107 situated at the front, or vice versa, the order being of very little importance, or simultaneously. This holding-in-place is notably visible in FIGS. 9, 13 and 14.

Likewise, the forming device 2 may comprise, at the top, similar upper downstream conveyors, which have not been depicted. These upper downstream conveyors are positioned above the plane of the other conveyors, at a height that is defined according to the dimensions of the container 1 that is to be formed. The upper downstream conveyors, which are also equipped with cleats, then fold the horizontal flaps 107 situated higher up or at the top.

More specifically, the forming device 2 comprises means 5 for folding the vertical flaps 106 of said cardboard sheet 100. Such folding means 5 are mounted on a fixed structure, attached to the installation, to the floor and/or to at least the upstream conveyor 3.

Said folding means 5 are situated symmetrically on each side of at least said upstream conveyor 3. As a preference, said folding means 5 extend on each side of the upstream conveyor 3 and of the at least one downstream conveyor 4, notably at the adjacent ends of these conveyors. The folding means 5 are therefore positioned at the end of the upstream conveyor 3 and at the start of the downstream conveyor 4.

As a result, advantageously, the invention makes provision for holding the case 100 in place with improved folding of the vertical flaps 106, providing positive referencing during the transfer between the upstream conveyor 3 and the downstream conveyor 4. In so doing, the invention makes provision for all the vertical flaps 107 to be folded at the same moment, but also for the case 100 to be held in place once this folding has been performed, until such point as it is taken on by said at least one downstream conveyor 4.

To do this, on each side, said folding means 5 comprise at least a pair of downstream and upstream pushers 50 forming a gripper. In addition, said pushers 50 are actuated jointly from an open position toward a closed position of folding said corresponding vertical flaps 106. Conversely, the actuation of the pushers 50 moves them from the closed position toward the open position. It will be noted that, in the closed position, the pushers 50 are closed or clamped together. In the open position, the pushers 50 are retracted, which is to say that they do not interfere with the path of movement of the sheet 100.

More specifically, one pair of pushers 50 is situated on the left while another pair is situated on the right. Each pair forms a gripper able to fold the vertical flaps 106 situated at the front and at the rear, on the corresponding side. As a result, all the pushers 50 are actuated jointly, so as to perform simultaneous folding of all the vertical flaps 106. In short, the right and left grippers are closed together, ensuring uniformly distributed forces on the sheet 100, reducing the risks of deformation, of offsetting and of unwanted shifting of the products.

What is more, said folding means 5 comprise at least a support 6 for each gripper, namely for a pair of pushers 50 that is situated on the right and for a pair situated on the left. Advantageously, said support 6 is mobile in said direction of travel. In short, each support 6 is driven on an outbound path from upstream toward downstream and conversely along a return path. Furthermore, the folding is performed along the outbound path, whereas the grippers are open along the return path, as visible in FIG. 14.

In this way, the movement of each support 6 allows the grippers to accompany the travel of the sheet 100, notably ensuring the continuous aspect of the forming. This movement of each support 6 means that, once the vertical flaps 106 have been folded, the sheet 100 now held in place and trapped between the grippers can be moved, particularly during the transfer between the upstream conveyor 3 and the at least one upstream conveyor 4, until the latter takes it on, whereupon the container 1 can then be released by opening the grippers. This transfer up to the point of this takeover is notably visible in FIGS. 11 to 13.

Each support 6 is driven linearly by suitable motorized means, in the form of a drive belt or chain, or even using a linear motor.

It will be recalled that a linear motor is an electric motor in which each rotor and each stator are unwrapped, in particular flat; the linear motor generates a force for moving, in particular in translation, at least one rotor relative to the stator. In this instance, as a preference, each support 6 forms a rotor that is moved along one or more stators.

In this respect, the folding means 5 may comprise a guide 7 for each support 6. Each guide 7 extends longitudinally over a determined distance, approximately corresponding, before the end of the upstream conveyor 3 and after the takeover by the at least one downstream conveyor 4.

In the case of a linear motor, each guide 7 then forms a stator.

According to the above-mentioned embodiments, each support 6 is then motorized for translational movement along at least a guide 7 from an upstream position to a downstream position, and vice versa.

According to another possible embodiment, each support 6 is mounted at the end of a robot arm, of a multi-axis robot or articulated robot type.

As a preference, in order to coordinate the operation of the device 2 with the movement of the sheet 100, said forming device 2 may comprise at least one controller controlling, in synchronized manner, the joint actuation of the pushers 50 of each gripper on each side with the movement of said support 6, with respect to the driving of said upstream conveyor 4. Such a controller may in the conventional way comprise computer means and/or automatic means necessary for its operation and for its configuration by an operator. Thus, the invention provides a specific controller which manages the movements of the supports 6 and the simultaneous opening/closing of the pushers 50 with respect to the movement of the sheet 100 on the upstream conveyor 4.

Furthermore, the movements of the supports 6 are controlled in perfect synchrony, on the right as on the left. In short, the longitudinal positions of the supports 6 are the same at each instant, as are their speeds.

In addition, the controller is therefore able to synchronize the supports 6 both in position and in speed so that the pushers 50 perfectly face the vertical flaps 106 and so that said supports 6 accompany the movement of the sheet 100 that is to be folded and grasped for transferring it.

The controller may also allow the movement of the supports 6 to be accelerated, notably in order to reduce the time spent on the return path when the folding means 5 are empty with the pushers 50 in the open position, allowing them to return more swiftly in order to process the next sheet 100.

In this respect, once the sheet 100 has been grasped by the grippers, as it leaves the upstream conveyor 3, controlling the mobility of the supports 6 makes it possible to maintain the same speed, to accelerate or to decelerate, in order to establish a reference with respect to said at least one downstream conveyor 4, notably the positions of the corresponding cleats 42.

More specifically, when the pushers 50 are in the closed position, said folding means 5 form a means of transferring said sheet 100 from said upstream conveyor 3 toward said downstream conveyor 4 by gripping said sheet. In short, the forming device 2 comprises means for transferring the sheet by grasping hold of it, these transfer means consisting of the folding means 5 in the form of pushers 50 mounted on a mobile support 6.

Figure 7:
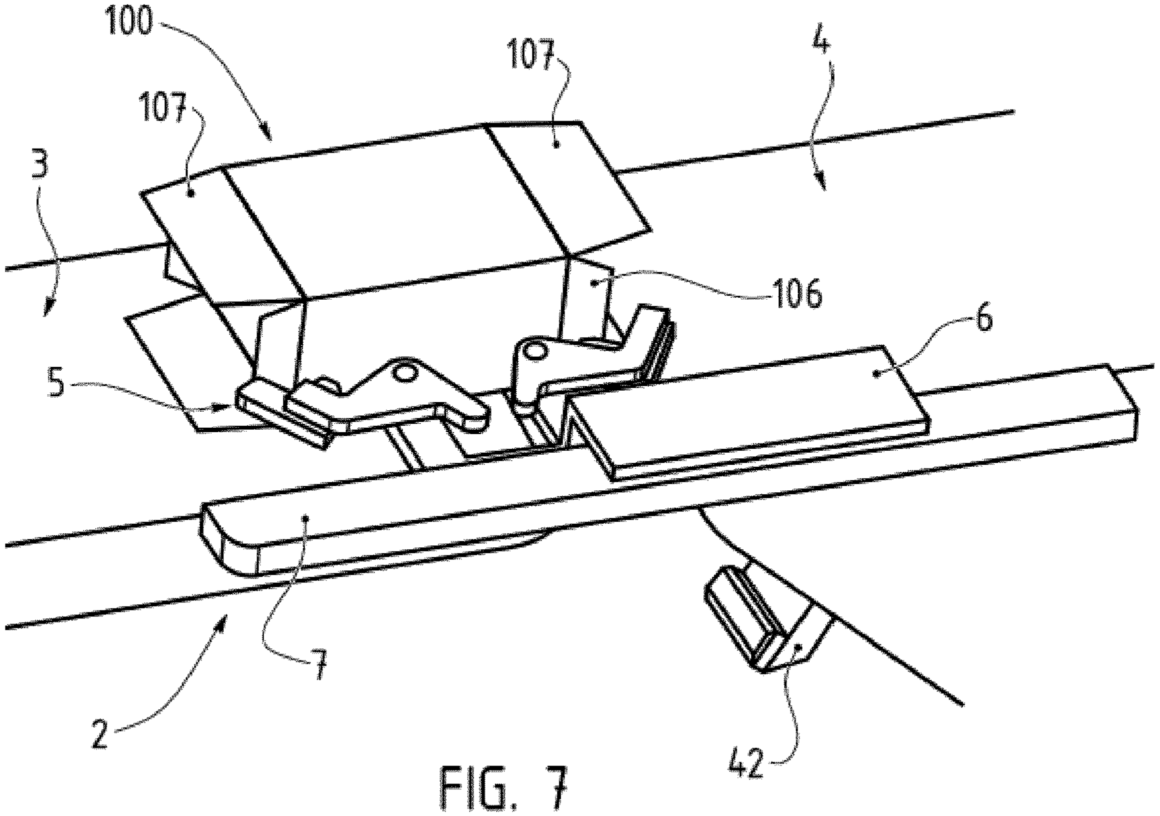
FIG. 7 schematically depicts a perspective view of one embodiment of the device for forming by folding, simplified to just one side of the upstream and downstream conveyors, notably showing the grippers in the open position.
Figure 8:
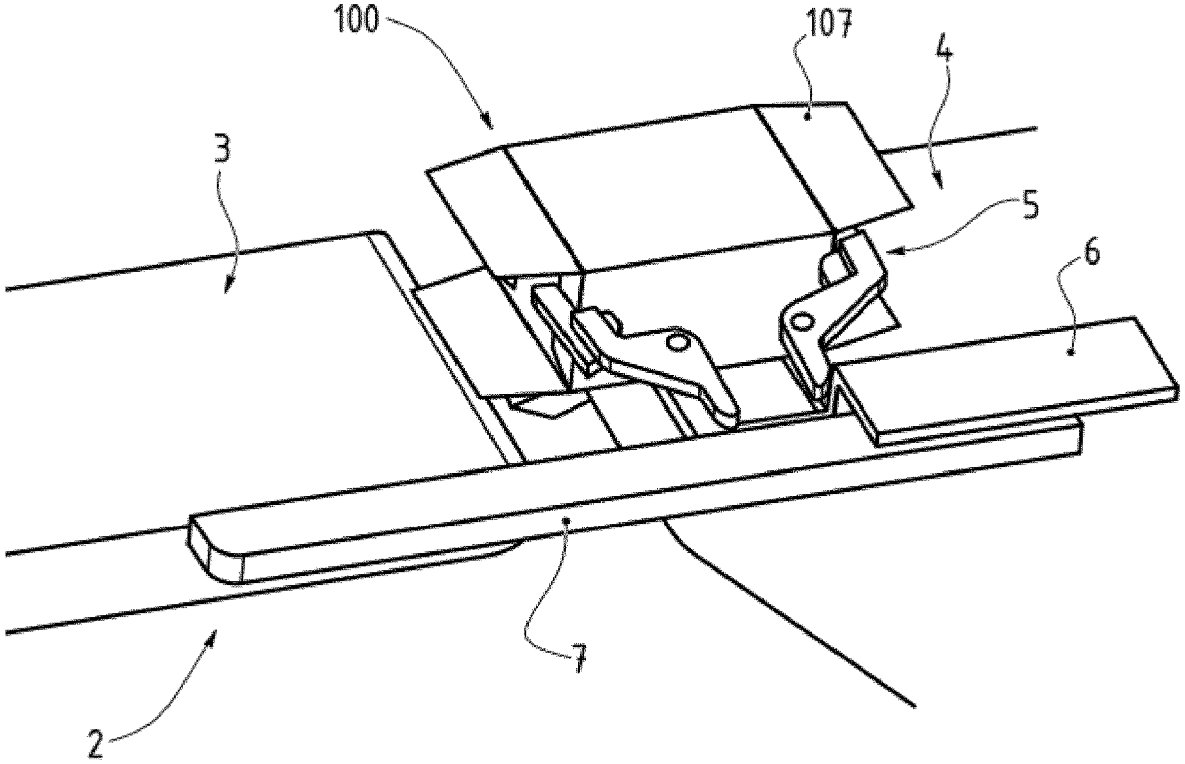
FIG. 8 schematically depicts a view similar to FIG. 7, notably showing the grippers in the position of gripping and accompanying a cardboard sheet, after the folding of the vertical flaps.
Figure 9:
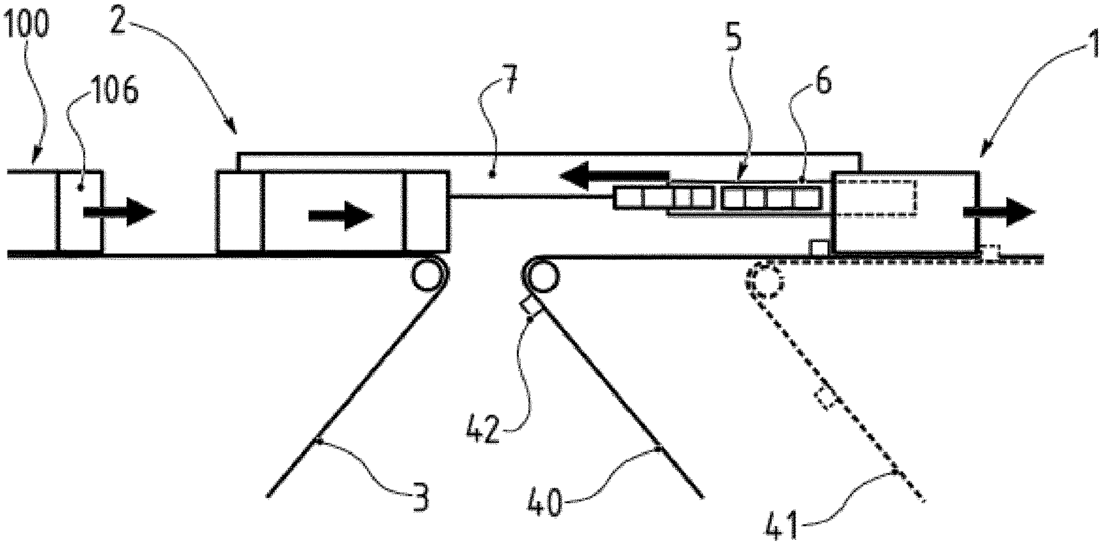
FIG. 9 schematically depicts a side view of said forming device, notably showing the return travel of the mobile support after the output conveyor has taken hold of a cardboard sheet now formed into a case.
Figure 10:
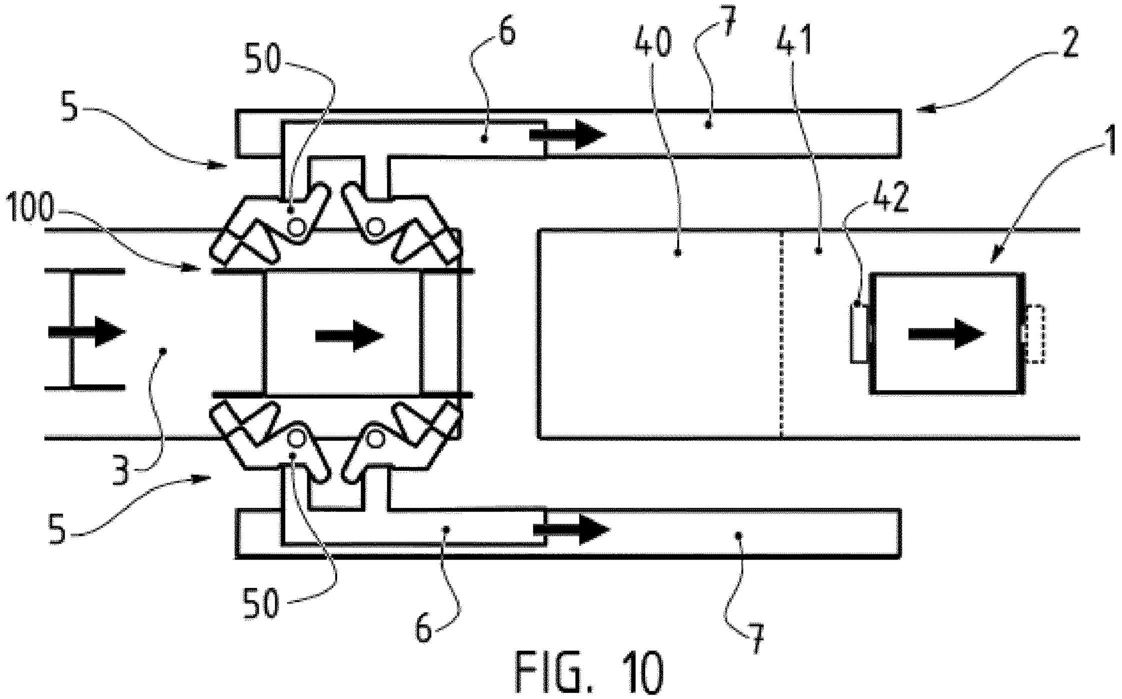
FIG. 10 schematically depicts a simplified elevation of the forming device, corresponding to a first step, notably showing the grippers situated on either side in the open position before taking hold of a sheet, with synchronized movement.
Figure 11:
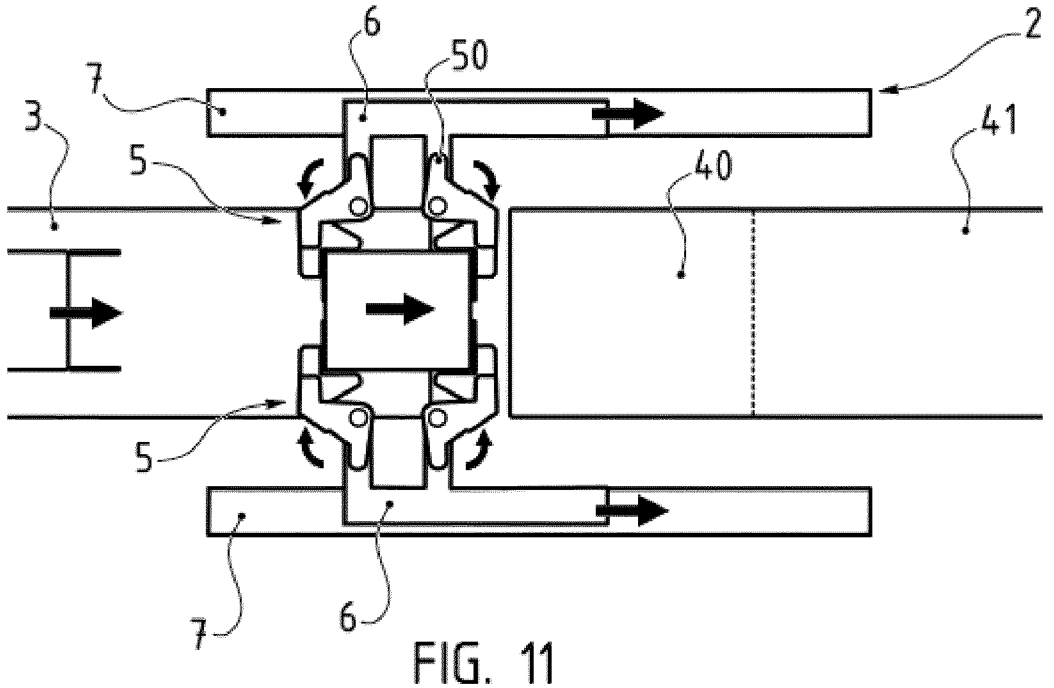
FIG. 11 schematically depicts a view similar to FIG. 10 and corresponding to a next step, notably showing the grippers in the position of gripping said cardboard sheet, after the folding of the vertical flaps.
Figure 12:
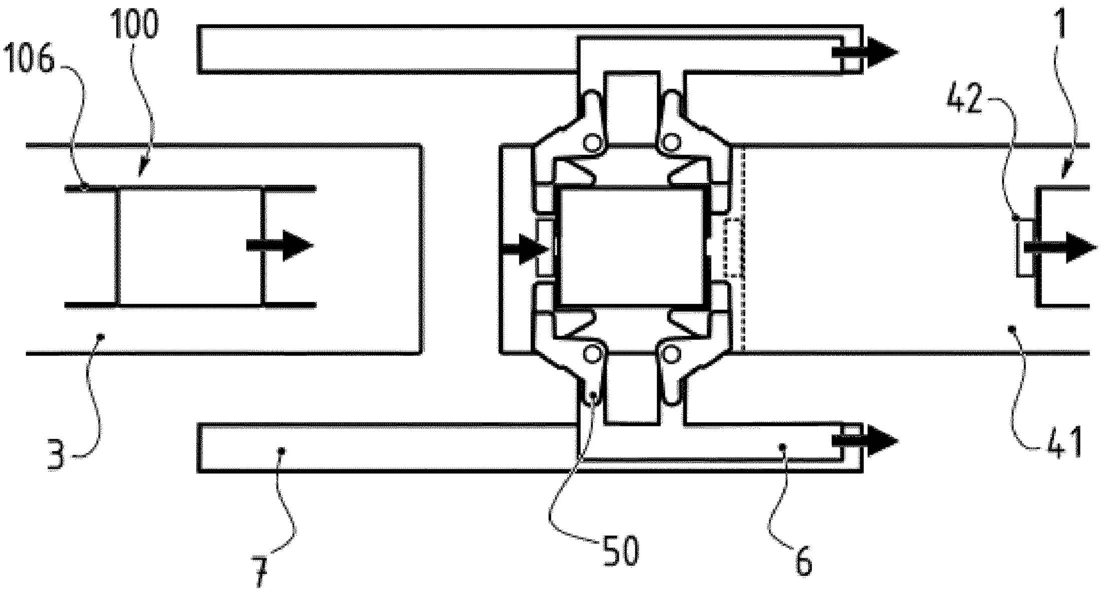
FIG. 12 schematically depicts a view similar to FIG. 11 and corresponding to a next step, notably showing the grippers maintaining the gripped position and accompanying said cardboard sheet, taken on by the downstream conveyors.
Figure 13:
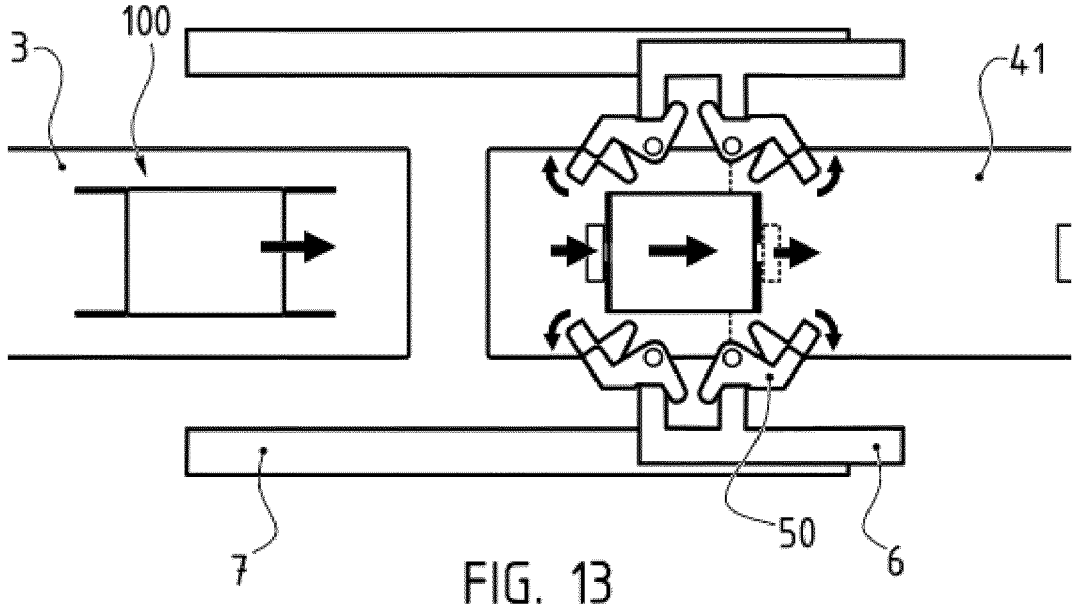
FIG. 13 schematically depicts a view similar to FIG. 12 and corresponding to a next step, notably showing the grippers passing into the open position, releasing said sheet, formed into a case, taken on by said downstream conveyors.
Figure 14:
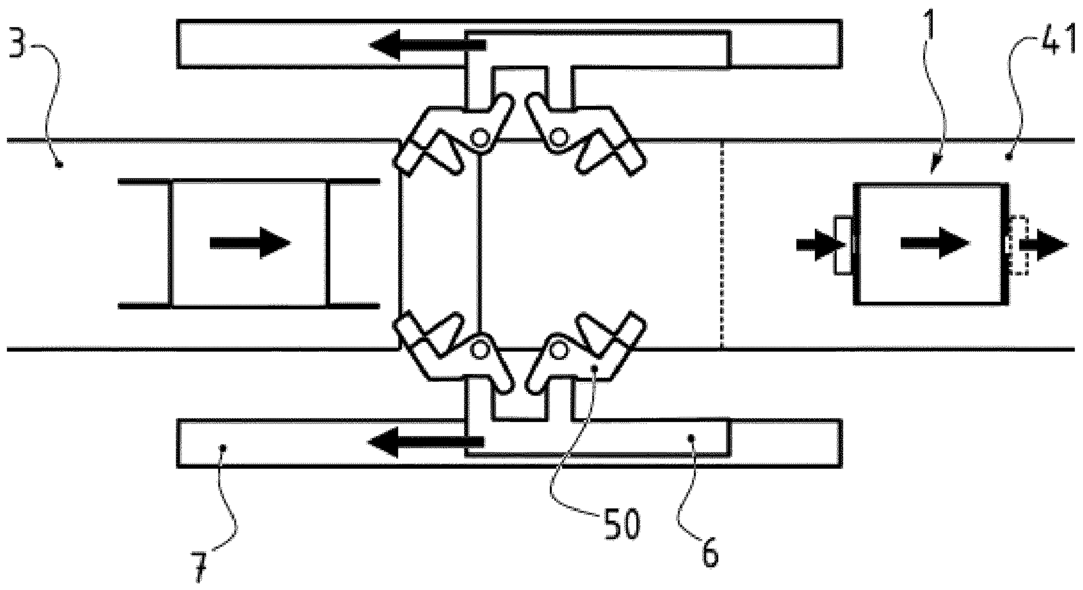
FIG. 14 schematically depicts a view similar to FIG. 13 and corresponding to a next step, notably showing the return of the support from downstream to upstream with the grippers open, ready to process a next sheet.

More specifically, according to a preferred embodiment, as visible in FIGS. 7 and 8, each pusher 50 is mounted with the ability to rotate with respect to said support 6. In particular, such rotation may be brought about via at least one pivot point, as visible in FIGS. 10 to 14. Each pusher 50 therefore rotates in order to pass from the open position to the closed position. Such rotation notably makes it possible to reduce the incident forces liable to shift the sheet 100 or the products during the course of the folding of the vertical flaps 106.

According to another embodiment, the pushers 50 may be subjugated to one or more linear movements, or a combination of such linear movements, via a suitable mechanism.

According to one embodiment, the pushers 50 of each gripper have adjustable separation In short, it is possible to move them closer toward or further away from the support 6 in order to adapt their distance according to the length of sheet 100 to be processed.

According to one embodiment, each of said pushers 50 comprises a removable gripping head. In short, it is possible to change the heads of the pushers 50 according to the dimensions of the sheet 100. Thus, by keeping the same mechanism for the pushers 50, changing the head provides adaptability to suit the need.

More specifically, as a preference, said head may comprise at least a plate provided with an orthogonal concave contact surface. In short, the contact face intended for folding the vertical flaps 106 has a squared-off shape, with perpendicular walls. This shape notably allows the vertical flaps 106 to be folded at right angles while at the same time ensuring pressure against the corresponding lateral wall 102, 103, thus improving the retention of the sheet 100 during the folding and after it has been grasped for transferring it.

According to one embodiment, the pushers 50 situated facing each other are aligned in the one same plane or substantially the same planes. These planes are horizontal or substantially horizontal, parallel to the plane containing the surface of the upstream conveyor 4 and also the surface or surfaces of the downstream conveyor or conveyors 4, 40, 41.

More specifically, the pushers 50 may be dimensioned and positioned at a height that is adjustable so that the horizontal flaps 107 can be folded, without interference, while said pushers 50 are in the closed position.

It will be noted that it is also possible to open the pushers 50 at any moment, notably during the course of the folding of the horizontal flaps 107, so that the pushers 50 do not interfere during this operation.

According to another embodiment, the pushers 50 situated facing each other are offset vertically. In short, the pushers 50 on the right are higher up or lower down than the pushers 50 on the left. Thus, it is possible for the pushers 50 to cross one another as they close, transversely improving the grip of the sheet 100 over a greater width, notably beyond the width of the vertical flaps 106.

In such cases, with reference to the corresponding embodiment, the plate may exhibit a longer distal part. Furthermore, this lengthened distal part may enable any products that may have shifted from their initial position to be repositioned correctly by pushing them back toward the inside of the sheet 100.

The invention relates to a method for forming a container 1 by folding a cardboard sheet 100.

Such a forming method may be particularly suited to implementation of the forming device 2 according to the invention.

During the course of this forming method, at least a cardboard sheet 100 is driven in a direction of travel. This driving is done on the upper face of the upstream conveyor 3 toward said at least one downstream conveyor 4.

During the movement of said sheet 100, said vertical flaps 106 on each side of said cardboard sheet 100 are folded. In short, the vertical flaps 106 on the right and those on the left, on each side, are folded.

Advantageously, the vertical flaps 106 situated downstream and upstream with respect to said direction of travel are folded simultaneously. In addition, this folding is performed by simultaneously gripping each side by the closing of a gripper, namely a right and a left gripper at the same time. Furthermore, in the closed position, the grippers keep each sheet 100 grasped and accompany it as it is transferred.

With reference to the corresponding embodiment of the forming device 2, each gripper comprises pushers 50 and it is these that perform the folding by passing toward their position in which the corresponding gripper is closed.

In addition, as a preference, in the closed position, said cardboard sheet 100 is transferred from said upstream conveyor 3 toward said at least one downstream conveyor 4.

In either instance, the method manages the movements of the grippers, on the one hand, from their open position to their closed position, and vice versa, and on the other hand in terms of their longitudinal travel in the direction of travel.

In order to achieve this, each gripper is moved jointly in said direction of travel in a manner synchronized with the driving of said cardboard sheet 100 by said upstream conveyor 3.

In the case of the corresponding embodiment of the forming device 2, this management can be performed by the controller.

Thus, the way in which the container 1 is formed according to the invention, by simultaneously folding the four vertical flaps 106, at the front and at the rear and on the right and on the left, particularly via a rotation of the pushers 50, limits the disturbing forces liable to cause a loss of synchronization of the sheet 100 with respect to the machine.

The positive grasp by the grippers means that the sheet 100 is accompanied as it is transferred between the conveyors 3, 4, or even allows the sheet to be repositioned if it becomes slightly shifted. This retention of the cardboard sheet 100 by grasping it also means a high production rate can be ensured, or even that it can be accelerated.

The invention claimed is:

1. A device for forming a container by folding a cardboard sheet, said sheet being provided with at least vertical flaps, comprising at least:

an upstream conveyor driving said cardboard sheet in a direction of travel;

a downstream conveyor;

a folding means for folding the vertical flaps of said cardboard sheet, said folding means being situated symmetrically on either side of at least said upstream conveyor;

wherein, on each side, said folding means comprise:

a downstream pusher and an upstream pusher forming a gripper, the pushers being actuated jointly from an open position to a closed position of folding said corresponding vertical flaps, and from the closed position back to the open position;

a support for each gripper comprising the downstream pusher and the upstream pusher, the pushers being pivotally mounted to the support, the support being mobile in the direction of travel, wherein the folding means for folding the vertical flaps comprises a guide for the support, the guide extending longitudinally over a determined distance and permitting the support to be translatably mounted thereto.

2. The forming device as claimed in claim 1, further comprising at least one controller controlling, in a synchronized manner, a joint actuation of the pushers of each gripper on each side with a movement of said support along the guide, with respect to the driving of said upstream conveyor.

3. The forming device as claimed in claim 2, wherein, when the pushers are in the closed position, said folding means form a means of transferring said sheet from said upstream conveyor toward said downstream conveyor by gripping the sheet.

4. The forming device as claimed in claim 2, wherein each pusher is rotatably mounted to the support.

5. The forming device as claimed in claim 2, wherein the pushers situated facing each other are offset vertically.

6. The forming device as claimed in claim 2, wherein the pushers of each gripper have adjustable separation.

7. The forming device as claimed in claim 2, wherein each of said pushers comprises a removable gripping head.

8. The forming device as claimed in claim 2, wherein each support is motorized for translational movement along at least a guide from an upstream position to a downstream position, and from a downstream position back to the upstream position.

9. The forming device as claimed in claim 1, wherein each pusher is rotatably mounted to the support.

10. The forming device as claimed in claim 1, wherein the pushers situated facing each other are offset vertically.

11. The forming device as claimed in claim 1, wherein the pushers of each gripper have adjustable separation.

12. The forming device as claimed in claim 1, wherein each of said pushers comprises a removable gripping head.

13. The forming device as claimed in claim 12, wherein said head comprises at least a plate provided with an orthogonal concave contact surface.

14. The forming device as claimed in claim 1, wherein each support is motorized for translational movement along at least a guide from an upstream position to a downstream position, and vice versa.

15. A method for forming a container by folding a cardboard sheet, said sheet being provided with at least vertical flaps, in which forming method at least:

a cardboard sheet is driven in a direction of travel on an upper surface of an upstream conveyor toward at least a downstream conveyor;

said vertical flaps on each side of said cardboard sheet are folded;

wherein:

the vertical flaps situated downstream and upstream in relation to said direction of travel are folded simultaneously by gripping each side simultaneously by closing a gripper to a closed position, wherein the grippers each comprise an upstream pusher and a downstream pusher pivotally mounted to a support and wherein each of the pushers are jointly activated to form the closed position.

16. The forming method as claim 15, wherein:

each gripper is moved jointly in said direction of travel in a manner synchronized with the driving of said cardboard sheet by said upstream conveyor.

17. The forming method as claimed in claim 16, wherein:

in the closed position, said cardboard sheet is transferred from said upstream conveyor toward said at least one downstream conveyor.

18. A device for forming a container by folding a cardboard sheet, the sheet being provided with at least vertical flaps, comprising at least:

an upstream conveyor driving the cardboard sheet in a direction of travel;

a downstream conveyor separated from the upstream conveyor; and a folding mechanism for folding the vertical flaps of the cardboard sheet, the folding mechanism being situated symmetrically on either side of at least the upstream conveyor;

wherein, on each side, the folding mechanism comprises:

a gripper comprising a downstream pusher and an upstream pusher, the pushers being actuated jointly from an open position to a closed position of folding the corresponding vertical flaps, and back from the closed position to the open position;

a support traversable in the direction of travel and comprising a base for permitting the downstream pusher and the upstream pusher to be pivotally mounted thereto, and wherein the folding mechanism comprises a guide for the support, the guide extending longitudinally over a determined distance and permitting the support to be translatably mounted thereto and moveable therealong.

19. The device of claim 18, wherein the pushers of the gripper are configured for adjustable separation so as to adapt to a size of the sheet to be processed.

* * * * *